Feb. 4, 1969   J. A. VAN HORN   3,425,211
WATCH RATE REGULATOR
Filed Jan. 25, 1968

INVENTOR
JOHN A. VAN HORN

BY  Le Blanc & Shur.

ATTORNEYS 3,425,211
WATCH RATE REGULATOR
John A. van Horn, Lancaster, Pa., assignor to Hamilton Watch Company, Lancaster, Pa., a corporation of Pennsylvania
Continuation-in-part of application Ser. No. 539,507, Apr. 1, 1966. This application Jan. 25, 1968, Ser. No. 700,496
U.S. Cl. 58—107                                  11 Claims
Int. Cl. G04b 17/00

ABSTRACT OF THE DISCLOSURE

The watch rate regulator hereof provides for the simultaneous movement of a pair of weights along linear paths lying along chord lines of a circle coincident with the axis of rotation of a balance wheel to change the moment of inertia thereof while maintaining the center of gravity of the balance wheel constant with respect to its axis of rotation. A lever is pivotally carried by the balance wheel at a point offset from the axis of rotation of the balance wheel and coincident with the center of gravity of the two weights, pivotal action of the lever displacing the weights along the paths such that the center of gravity of the weights remains constant throughout the full range of movement.

Background of the invention

This application is a continuation-in-part of my copending application Ser. No. 539,507 filed April 1, 1966, now U.S. Patent No. 3,382,667 dated May 16, 1968.

This invention relates to rate regulation of timepieces and other rotating and oscillating systems and more particularly to a device for regulating the frequency of oscillation of the balance wheel of a watch or clock. An important feature of the present invention resides in the simultaneous movement of a pair of weights along paths lying along different parallel chord lines of a circle having its center coincident with the axis of rotation of the balance wheel, whereby the balance wheel moment of inertia may be altered while maintaining the center of gravity thereof constant with respect to the balance wheel axis of rotation throughout the full range of movement of the weights.

Watch rate is determined by the frequency of oscillation of the balance wheel. To adjust the oscillatory frequency thereof, either the strength of the hairspring or the moment of inertia of the balance wheel or both may be altered.

Watch rates are often controlled by a device which alters the effective length of the hairspring so as to change hairspring strength. The simplicity of this type of construction and the large rate corrections permitted thereby are significant advantages of this type of device. Slight changes in the location of the regulator along the length of the hairspring, however, result in large changes in balance wheel frequency and this extreme sensitivity precludes accurate incremental rate changes. Such sensitivity stems from the fact that the hairspring is usually not completely uniform from one short section to the next, and from the fact that the regulator depends upon friction for its location and may shift slightly after regulation has been accomplished.

Meantime screws are often employed in high quality watches for effecting a change in the moment of inertia of the balance wheel. These screws are tightly fitted, usually threaded, in the rim of the balance wheel on diametrically opposite sides thereof with the axes of the screws lying along a common diameter of the balance wheel. By threading these screws radially inwardly or outwardly, the center of mass of each screw is altered with respect to the axis of rotation of the balance wheel, thereby effecting a change in the moment of inertia of the wheel. Rate regulation by means of meantime screws, however, is a cumbersome procedure and will deleteriously affect the poise or center of gravity of the balance wheel unless accurately performed. To preclude imbalance of the balance wheel and provide the proper poise thereto, the center of gravity of the wheel must at all times lie coincident with the axis of rotation of the balance wheel. Otherwise, the balance wheel rate is affected by the physical orientation of the timepiece or watch. Accordingly, not only must these meantime screws lie on diametrically opposite sides of the balance wheel, but the adjustment of each weight along the common diameter must be identical with the adjustment of its diametrically opposite weight in order to maintain the poise of the balance wheel. Large rate errors may result from offsetting the center of gravity of the wheel even slightly from the axis of rotation thereof. In known meantime screw systems, however, inertial and hence rate adjustment of the balance wheel requires a double adjustment, that is, each of the diametrically opposite screws must be individually threaded to change the radial distance thereof from the axis of rotation of the balance wheel. This requires precision and accuracy in matching the adjustment of each screw with the other. Lacking this, the center of gravity of the wheel would be offset from its axis of rotation with the result that the wheel would oscillate at an erratic rate.

Other devices for rate regulation have been proposed and have generally been based upon the use of movable weights located on diametrically opposite sides of the balance staff. Where the weights are not interconnected, such systems require double adjustment and where the weights are connected, the connecting device passes through and interferes with the center of gravity of the balance wheel.

Summary of the present invention

The watch regulator of the present invention provides a simple and inexpensive mechanism which avoids the foregoing difficulties and provides for the simultaneous movement of a pair of weights by a single adjustment to effect a change in the balance wheel moment of inertia and hence its rate while maintaining the center of gravity of the balance wheel constant with respect to the balance wheel axis of rotation. It has been found that linear movement of a pair of weights along different chord lines of a circle having its center coincident with the axis of rotation of the balance wheel with the center of gravity of the weights being maintained at a constant position offset from the center of the balance wheel throughout the full range of movement of the weights provides a sensitive adjustment of the moment of inertia and hence rate of rotation of the balance wheel. Moreover, this adjustment is accomplished without interference through the center of the balance wheel.

It is therefore a primary object of the present invention to provide an improved device for altering the moment of inertia of an oscillating or rotating system without altering the system's center of gravity with respect to its axis of movement.

It is another object of the present invention to provide an improved rate regulator for oscillating systems which is simple in construction and method of adjustment.

It is still another object of the present invention to provide a watch rate regulator wherein frequency of the balance wheel is altered by simultaneously displacing a pair of non-diametrically opposed weights along predetermined paths by the movement of a single member while maintaining the center of gravity of the weights constant throughout their full range of movement.

It is a further object of the present invention to provide a watch rate regulator wherein a pair of weights are simultaneously moved along linear paths to alter the balance wheel moment of inertia while maintaining the center of gravity of the weights constant throughout their full range of movement and at a point radially offset from the balance wheel axis of rotation. This is accomplished by displacing the weights along paths lying along the chord lines, preferably parallel, of a circle having its center coincident with the axis of rotation of the balance wheel whereby the weights are simultaneously displaced in opposite directions along the chord lines respectively increasing and decreasing their radial distance from the balance wheel center, thereby effecting a net change in the moment of inertia of the balance wheel.

These and further objects and advantages of the present invention will become more apparent upon reference to the following specification, claims, and appended drawings.

*Description of the drawing figures*

*Description of a preferred embodiment*

Figure 1:
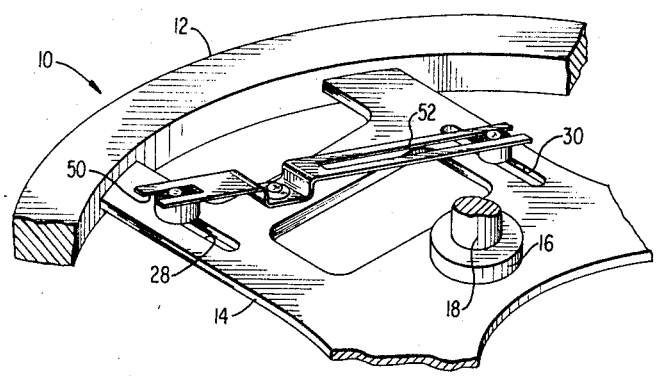
FIGURE 1 is a fragmentary perspective view of a watch rate regulator constructed in accordance with the present invention and mounted on the balance assembly of an oscillating system.
Figure 2:
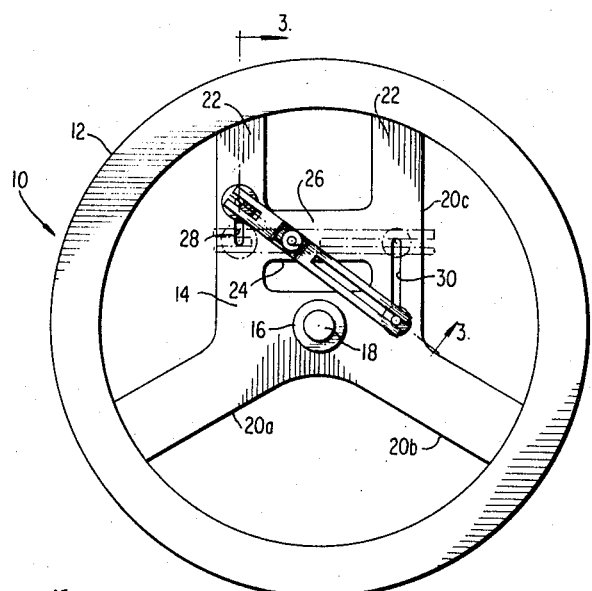
FIGURE 2 is a full plan view of the rate regulator and balance assembly illustrated in FIGURE 1.

Referring to the drawings and particularly to FIGURES 1 and 2, there is shown a balance assembly including a balance wheel, generally indicated at 10, comprising a circular outer rim 12 joined by an inner planar support member 14 to a central hub 16. Hub 16 is centrally apertured to receive and is suitably fixed to a balance wheel staff 18 whereby balance wheel 10 is mounted for conjoint rotation with staff 18. Balance staff 18 may comprise any conventional balance staff having the usual pivots at its opposite ends for reception in bearings in a watch bridge and pillar plate, the bearings, bridge and pillar plate not being shown as they comprise conventional structure known to those practiced in this art.

The balance assembly may be oscillated by a conventional hairspring assembly, also not shown, connected to balance staff 18 for returning the balance wheel after it is driven in opposite directions, for example, by an electrical coil mounted on the balance wheel forming an electric watch movement of the type shown in Van Horn et al. Reissue Patent No. 26,187, dated April 4, 1967. Reference may be had to that patent for a more detailed description of the balance wheel drive and associated balance assembly structure, it being understood that the present invention is equally applicable to other types of watch and clock constructions incorporating an oscillating element in the nature of a balance wheel.

Inner support 14 comprises three radially extending spoke-like elements 20a–c connecting rim 12 to hub 16 and equally spaced circumferentially about hub 16. While spoke-like elements 20a and 20b comprise unitary radially extending arms, spoke-like element 20c is formed to provide an H-shape with the legs 22 of such H-shaped spoke-like element extending along spaced parallel chord lines lying on opposite sides of the axis of rotation of wheel 10 and having equal radii extending normal thereto.

A pair of linearly extending slots or tracks 28 and 30 are formed through each of legs 22 with the left hand slot 28, as seen in FIGURE 2, extending from about medially of H-shaped spoke-like element 20c outwardly toward rim 12 and the right hand slot 30 extending from about medially of element 20c inwardly toward the lower portion of the H-shaped element 20c or the rim portion on the diametrically opposite side of wheel 10. Slots 28 and 30 extend, preferably in spaced parallel relation one to the other and preferably lie along non-diametrical chord lines extending along diametrically opposite sides of the axis of rotation of wheel 10. In other words, slots 28 and 30 lie in spaced parallel planes on opposite sides of and parallel to a plane containing the axis of rotation of balance wheel 10, the normal distance or radius from the axis of rotation of the wheel to each slot-containing plane being equal. A pair of weights 32 and 34 lie in following engagement along slots 28 and 30, respectively, weights 32 and 34 having pintles 36 and 38, respectively, which project from the undersurfaces thereof into the corresponding slots.

Figure 3:
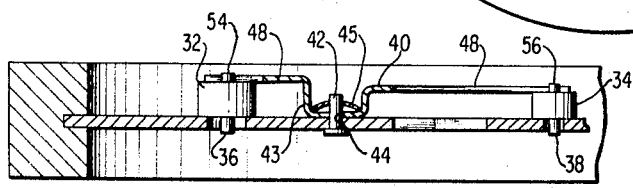
FIGURE 3 is an enlarged fragmentary cross sectional view thereof taken about the line 3—3 of FIGURE 2.

To simultaneously and accurately locate the weights in predetermined positions along slots 28 and 30, a lever 40 is pivotally mounted on a pinion 42 upstanding from cross member 26 of H-shaped element 20c whereby lever 40 is eccentrically mounted relative to the axis of rotation of wheel 10. As best seen in FIGURE 3, lever 40 is bent intermediate its ends to form a generally U-shaped recess indicated at 43 with the base of recess 43 being apertured as at 44 to receive pinion 42. Lever 40 is retained in selected rotatably adjusted positions by means of a resilient cap 45 fixed to pinion 42 and frictionally bearing against the base of recess 43. The U-shaped recess 43 of lever 40 is formed such that the laterally extending arms 46 and 48 of lever 40 are spaced above support 14 distances whereby the opposite end portions of arms 46 and 48 overlie weights 32 and 34, respectively. These opposite end portions are provided with lengthwise extending slots 50 and 52, respectively, and pintles 54 and 56 which project from the upper surface of weights 32 and 34 are received in slots 50 and 52. It will thus be seen that pivotal movement of lever 40 simultaneously displaces weights 32 and 34 in opposite directions along their respective slots 28 and 30 with the weights sliding lengthwise along lever 40 in their associated lever end slots 50 and 52.

The foregoing balance assembly including weights 32 and 34 and lever 40 is prepoised about the axis of rotation thereof in any conventional manner as by adding weight to rim 12. Additionally, lever 40 is prepoised about its pivotal axis 42 which is coincident with the center of gravity thereof. In this manner, lever 40 can rotate about pivot 42 without changing either its poise or moment of inertia. In a specific preferred embodiment hereof, lever arm 46 is one-half the length of lever arm 48 and the mass of the lever is accordingly distributed such that the foregoing conditions are satisfied, that is, the center of gravity of the lever per se is coincident with its axis of rotation about pinion 42. For any given lever position, in the preferred form hereof, the distance of weight 32 from the axis 42 of lever 40 is one-half the distance that weight 34 is from the axis 42 of lever 40. Weight 32, moreover, is twice the mass of weight 34 and accordingly the center of gravity of the weights 32 and 34 is coincident with the axis of rotation 42 of lever 40. It will thus be seen that equal moments about pinion 42 are maintained throughout the full range of pivotal movement of lever 40 as weights 32 and 34 are displaced in opposite chordwise directions along tracks 28 and 30, whereby the center of gravity of the weight-lever system is maintained coincident with pivot 42.

In use, when lever 40 is pivoted from a first position, for example, the full line position illustrated in FIGURE 2, to a second position, illustrated by the dashed lines in FIGURE 2, it will be seen that weight 32 is displaced inwardly along track 28 and inwardly toward pivot 42 along end slot 50 in lever 40. Simultaneously therewith, weight 34 is displaced outwardly along track 30 toward rim 12 and inwardly toward pivot 42 along slot 52 in the other end of lever 40. The displacement of the weights along their associated chordwise extending slots 28 and 30, as hereinbefore noted, is such that the center of gravity thereof remains a constant at pivot 42 throughout the full range of movement. However, a net change in the moment of inertia of the balance wheel is effected by such displacement. As weight 32 moves inwardly, the radial distance between weight 32 and the axis of rotation of wheel 10 decreases, thereby decreasing the movement of inertia of balance wheel 10. However, as weight 34 moves outwardly toward rim 12, the radial distance of weight 34 from the axis of rotation of wheel 10 increases, thereby increasing the moment of inertia of balance wheel 10. It can be seen that the radial distance of weight 34 from the axis of rotation 18 has been increased a greater extent than the radial distance from axis 18 to weight 32 has been decreased. Accordingly, a greater change in the moment of inertia of balance wheel 10 is effected by movement of weight 34 than by movement of weight 32 and the net change or increase in moment of inertia thus effected causes a change in oscillatory rate or frequency of rotation of the balance wheel, in the foregoing instance, a slowing down of the balance wheel. Rotation of lever 40 in the opposite clockwise direction, as seen in FIGURE 2, would, of course, result in a net decrease in the balance wheel moment of inertia causing an increase in the oscillatory rate thereof.

It is thus seen that the objects of the invention are fully accomplished and that there is provided a rate regulator for an oscillating system including a watch or timepiece which is simple in construction, readily and easily adjusted, and which requires only a single adjustment. Moreover, the rate regulator hereof is disposed to one side of the balance wheel, that is, it is offset from the axis of rotation thereof, whereby interference with the center of the balance wheel is precluded. Additionally, the present rate regulator provides for movement of the weights along separate, preferably parallel chord lines wherein the weights have a constant center of gravity which is radially offset from the axis of rotation of the balance wheel throughout the full range of movement of the weights, thereby maintaining the poise of the balance wheel assembly constant and coincident with the axis of rotation thereof while effecting a net change in the balance wheel moment of inertia and hence its oscillatory rate.

What is claimed and desired to be secured by United States Letters Patent is:

1. Apparatus for changing the moment of inertia of a rotatable body about its rotational axis without changing the center of gravity with respect thereto, comprising a pair of weights carried by said body and located in a first position, the center of gravity of the weights combined lying at a point spaced from the axis of rotation of said body, means for displacing said weights along separate predetermined linear paths to locate the same in a second position, said paths lying in spaced parallel planes paralleling a plane containing the axis of rotation of said body, said body being poised such that the center of gravity of the body and the weights lies substantially coincident with the center of rotation of said body.

2. Apparatus according to claim 1 wherein said first mentioned planes lie on opposite sides of the plane containing the axis of rotation of said body.

3. Apparatus according to claim 1 wherein said displacing means includes means for conjointly moving said weights along said paths.

4. Apparatus for changing the moment of inertia of a rotatable body about its rotational axis without changing the center of gravity with respect thereto comprising: a pair of weights carried by said body and located in a first position, means for displacing said weights along separate predetermined linear paths to locate the same in a second position, said paths lying in spaced parallel planes paralleling a plane containing the axis of rotation of said body, said body comprising a balance assembly including a balance wheel and an oscillating staff, said balance wheel being carried by said staff for oscillating movement therewith, said displacing means including a lever pivotally carried by said balance assembly, opposite end portions of said lever engaging said weights for displacing the same from first position to said second position in response to rotation of said lever relative to said balance assembly.

5. Apparatus according to claim 4 wherein said lever is pivotally carried by said balance wheel at a point radially spaced from the axis of rotation thereof.

6. Apparatus according to claim 5 wherein said balance wheel includes an outer rim and an inner support member joining said outer rim to said balance staff, linearly extending track formations carried by said support member and coincident with said paths, said weights lying in following engagement along said track formations and movable therealong in response to pivotal movement of said lever.

7. Apparatus according to claim 6 wherein said lever end portions have lengthwise extending slots formed therein, cooperative means on said weights engaging in said slot formations whereby said weights are movable lengthwise along said lever as said weights move in following engagement along said tracks.

8. Apparatus for changing the rate of oscillation of a rotatable body about its rotational axis without changing its center of gravity with respect thereto comprising rate regulator means including a pair of weights carried by said body and located in a first position, means for displacing said weights along separate predetermined linear paths to locate the same in a second position, said paths lying along two different chords of a circle having a center coincident with the axis of rotation of said body, the center of gravity of said rate regulating means lying at a point spaced from the axis of rotation of said body.

9. Apparatus according to claim 8 wherein said body comprises a balance assembly including a balance wheel and an oscillating staff, said balance wheel being carried by said staff for oscillating movement therewith, said displacing means including a lever pivotally carried by said balance assembly, opposite end portions of said lever engaging said weights for displacing the same from said first position to said second position in response to rotation of said lever relative to said balance assembly, the center of gravity of said weights lying at a point radially offset from the axis of rotation of said balance wheel.

10. Apparatus according to claim 9 wherein said lever is pivotally carried by said balance wheel, said balance wheel including an outer rim and an inner support member joining said outer rim to said balance staff, linearly extending track formations carried by said support member and coincident with said paths, said weights lying in following engagement along said track formations and movable therealong in response to pivotal movement of said lever.

11. Apparatus according to claim 10 wherein said lever end portions have lengthwise extending slots formed therein, cooperative means on said weights engaging in said slot formations whereby said weights are movable lengthwise along said lever as said weights move in following engagement along said tracks.

References Cited

UNITED STATES PATENTS

| 510,202 | 12/1893 | Smith | 58—108 |
| 798,993 | 9/1905 | Culman | 58—108 |
| 2,770,942 | 11/1956 | Favert | 58—107 |

FOREIGN PATENTS 255,475   1/1949   Switzerland.

STEPHEN J. TOMSKY, *Primary Examiner.*

S. A. WAL, *Assistant Examiner.*